(No Model.) 2 Sheets—Sheet 1.

M. BAUMANN.
SEAM WELDING MACHINE.

No. 563,997. Patented July 14, 1896.

WITNESSES:

INVENTOR
Morris Baumann
BY
Robinson Fisher
ATTORNEYS.

(No Model.) 2 Sheets—Sheet 2.
M. BAUMANN.
SEAM WELDING MACHINE.
No. 563,997. Patented July 14, 1896.
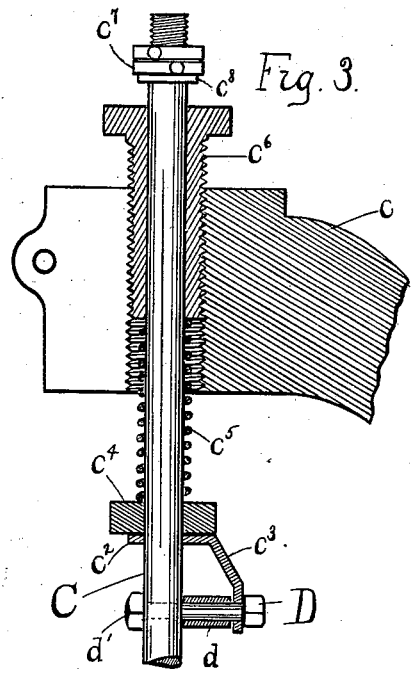
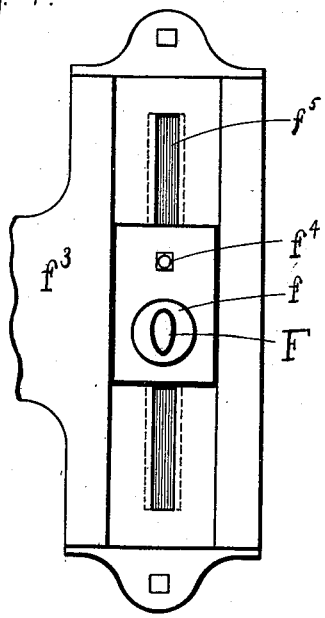
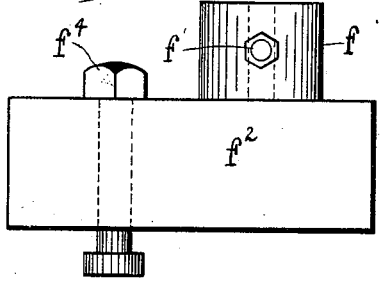
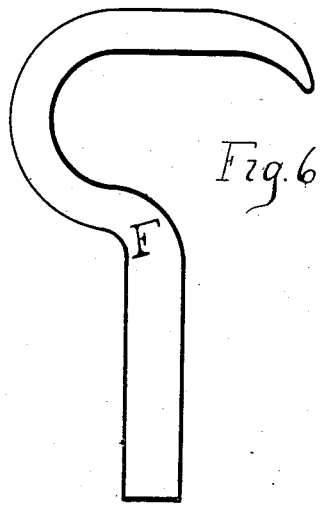
WITNESSES:
O. Philip Farnsworth
Samuel Lynk Jr
INVENTOR
Morris Baumann
BY
Robinson & Fisher
ATTORNEYS

UNITED STATES PATENT OFFICE.

MORRIS BAUMANN, OF NEW HAVEN, CONNECTICUT, ASSIGNOR TO THE BAUMANN RUBBER COMPANY, OF SAME PLACE.

SEAM-WELDING MACHINE.

SPECIFICATION forming part of Letters Patent No. 563,997, dated July 14, 1896.

Application filed April 22, 1896. Serial No. 588,676. (No model.)

*To all whom it may concern:*

Be it known that I, MORRIS BAUMANN, a citizen of the United States, and a resident of the city and county of New Haven, in the State of Connecticut, have invented a new and useful Improvement in Seam-Welding Machines, set forth and described in the following specification, taken in connection with the drawings, which form a part thereof, and in which—

Figure 2:
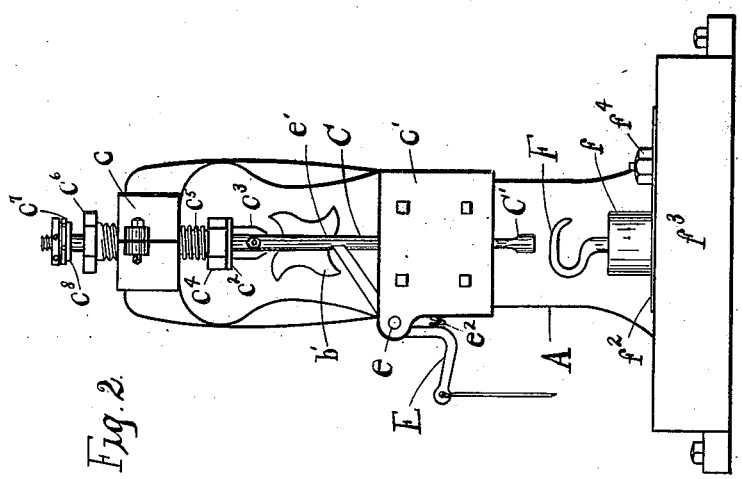
Figure 1:
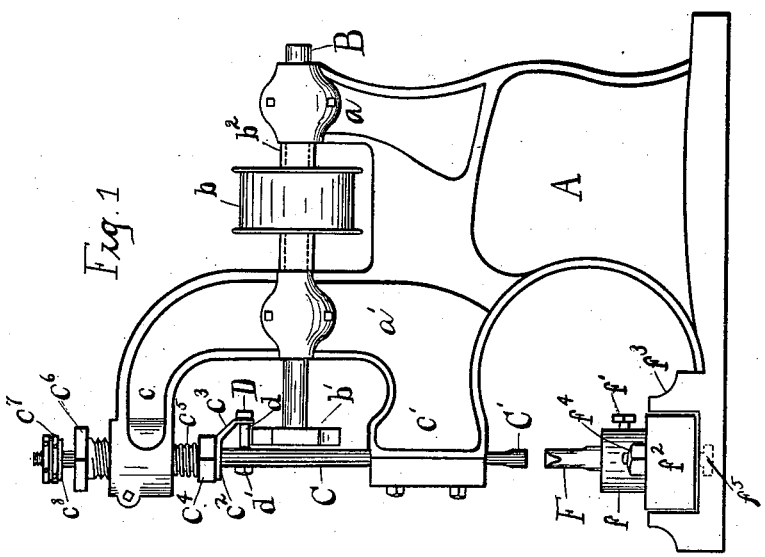

Figure 1 is a side elevation of the machine; Fig. 2, a front elevation of the same; Fig. 3, a detail view, partly in elevation and partly in section, of the upper portion of the hammer and bearings; Fig. 4, a plan view of the anvil and portion of the base upon which it is mounted; Fig. 5, a detail view, in side elevation, of the block in which the anvil is secured; Fig. 6, a detail view of the anvil.

In all figures similar letters of reference represent like parts.

This invention relates to machines for welding seams, and has for its object the production of a machine for the welding of rubber goods, such as rubber balls, finger-tips, &c.

To this end the invention consists of a hook-shaped anvil over which the edges of the pieces to be welded are passed and a reciprocating hammer which is raised by one or more cams on a rotating shaft, dropping of its own weight and under the pressure of a spring onto said goods while the same are being passed over said anvil, the repeated blows of the hammer thus welding the goods.

This invention consists, further, in the novel construction of said machine by which said seams are welded, the novel features of which are more specifically pointed out hereinafter.

Referring to the drawings, A represents the standard or main frame of the machine, which is to be bolted to a suitable bed-plate or foundation, said standard having the two arms $a$ and $a'$. A shaft B is journaled through the arms $a$ and $a'$, as shown in Fig. 1, and has keyed thereto, between said arms $a$ and $a'$, a sleeve $b^2$, with a flanged pulley $b$ formed integral therewith, and adapted to receive a belt from a counter-shaft. (Not shown.) At the inner end of said shaft is forged or secured in any suitable manner a cam-wheel $b'$.

A reciprocating hammer C, consisting of a straight rod of steel or other suitable material with a head C', passes through the extensions $c$ and $c'$ of the arm $a'$, which are grooved to form guides for said hammer when it is raised and lowered. A collar $c^2$, formed integral with a flat spring or brace $c^3$, is secured to said hammer between the extensions $c$ and $c'$ in any well-known manner. A nut $c^4$ surrounds the hammer C and rests on the collar $c^2$. A coiled spring $c^5$ rests on said nut $c^4$ and extends into the extension $c$ of the arm $a'$, which is internally threaded for an adjusting-screw $c^6$, against which the upper end of said spring bears. (See Fig. 3.) The extension $c$ is split vertically from the internal threading to the front side thereof, Figs. 2 and 3, the split portion being bolted together, so that it may be tightened or loosened. The hammer C extends through said adjusting-screw $c^6$ and is threaded a short distance from its end for a nut $c^7$, having a leather washer $c^8$ on the bottom thereof for the purpose of adjusting the length of the stroke of the hammer. A bolt D passes through the end of the flat spring or brace $c^3$ and said hammer C, below the collar $c^2$, and has mounted thereon a roller $d$ of steel or other suitable material between the hammer C and brace $c^3$, the spring and roller being secured in position by a nut $d'$ on the end of said bolt.

A bell-crank lever E is pivoted at $e$, the upper end of which when the machine is at rest fits into a notch $e'$ in the hammer C and supports the hammer in its raised position. A spring $e^2$, bearing on the elbow of said lever and against the extension $c'$ of the arm $a'$, constantly tends to force the upper end of said lever in engagement with the hammer C.

The anvil F is of peculiar construction, the lower end consisting of a vertical portion adapted to slide in the cylindrical block $f$ and in which it is held by an adjusting-screw $f'$. The upper portion of the anvil is of semicircular shape, the part directly beneath the hammer being somewhat flattened, as shown in Fig. 2. This cylindrical block $f$ is formed integral with a sliding block $f^2$, adapted to slide transversely in the bed $f^3$ of the frame A, to which it is secured by a bolt $f^4$, which fits in a T-shaped groove $f^5$ of said bed.

In operation the shaft B is first set in motion by means of the pulley $b$ in the usual manner, which causes the cam-wheel $b'$ to revolve rapidly. The article to be seamed is then placed on the hook-shaped anvil F, and the bell-crank lever E is released from engagement with the hammer C by pressure on the free end thereof overcoming the tension of the spring $e^2$. The free end of the lever may be connected with a treadle or other convenient device. The hammer C, being released, is forced down by the coiled spring $c^5$ until the hammer strikes the article to be seamed, when the revolution of the cam-wheel $b'$ against the roller $d$ successively raises the hammer against the pressure of the spring $c^5$. The spring $c^5$ is retained in its position by the nut $c^4$, on which one end of said spring bears, and the adjusting-screw $c^6$, fitting into the extension $c$ of the arm $a'$. The nut $c^7$ is used to adjust the length of the stroke, while the leather washer $c^8$ on the bottom thereof causes less wear and noise as the hammer is forced downward when the washer comes in contact with the head of the screw $c^6$.

Having now described my invention, what I claim, and desire to secure by Letters Patent, is—

1. In a seam-welding machine, an anvil, the lower end of which consists of a vertical portion adapted to be secured in a base, and the upper end being semicircular, with a slightly-flattened portion directly above the vertical portion, substantially as described.

2. In a seam-welding machine, the combination with the frame thereof; of a vertically-reciprocating hammer; a horizontal driving-shaft with a cam-wheel mounted thereon for operating said hammer; and an anvil, the lower and vertical portion of which is adjustably mounted in a horizontal sliding base, the upper portion being semicircular with a slightly-flattened portion directly beneath the head of said hammer, substantially as described.

3. In a seam-welding machine, the combination with the frame thereof; of an anvil, the upper portion of which is semicircular in shape, slightly flattened near the top, the lower portion consisting of a straight vertical length; a block adapted to slide horizontally in the base of said frame, and a cylindrical part mounted on and formed integral with said block in which the vertical portion of said anvil may be adjustably secured, substantially as described.

In witness whereof I have hereunto set my hand this 20th day of April, A. D. 1896.

MORRIS BAUMANN.

Witnesses:
GEORGE JACOB,
GEORGE W. ROBINSON.